UNITED STATES PATENT OFFICE.

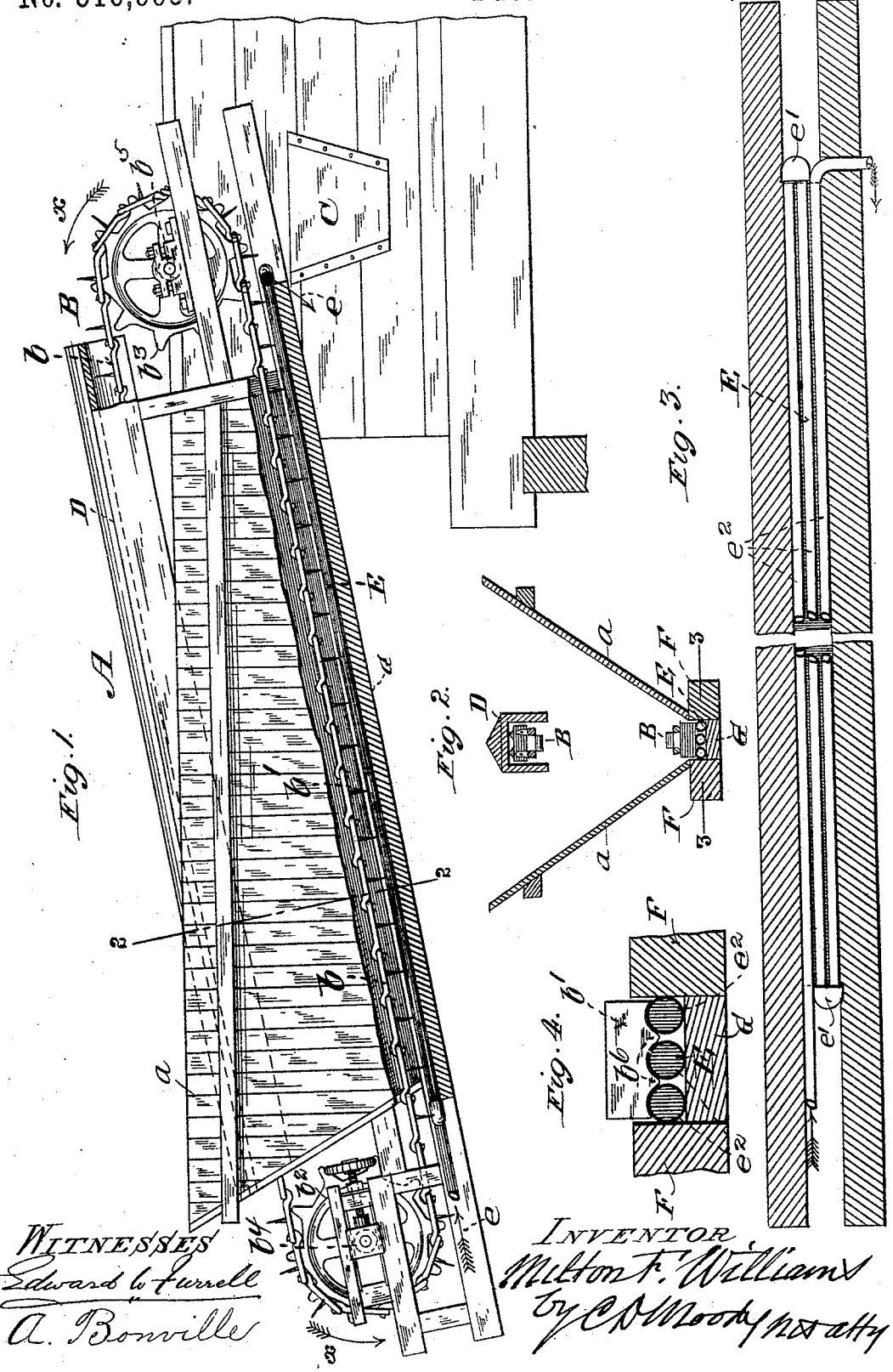

MILTON F. WILLIAMS, OF ST. LOUIS, MISSOURI.

CLAY-FEEDER.

SPECIFICATION forming part of Letters Patent No. 516,995, dated March 20, 1894.

Application filed August 26, 1892. Serial No. 444,231. (No model.)

*To all whom it may concern:*

Be it known that I, MILTON F. WILLIAMS, of St. Louis, Missouri, have made a new and useful Improvement in Clay-Feeders for Pug-Mills, (though, of course, it can easily be applied to clay-pulverizers,) of which the following is a full, clear, and exact description.

The invention relates mainly to the lower portion of the hopper, whereby a desirable bottom for the hopper is obtained, and the clay kept from sticking, and advantageously fed, substantially as is hereinafter set forth and claimed, aided by the annexed drawings, making part of this specification, in which—

Figure 1 is a side elevation, partly in section, of the improved feeder; Fig. 2 a vertical, cross-section on the line 2—2 of Fig. 1; Fig. 3 a horizontal, longitudinal, section on the line 3—3 of Fig. 2; and Fig. 4 a detail, upon an enlarged scale, being a vertical cross section of the bottom of the hopper, and showing one of the conveyer-flights in position.

The same letters of reference denote the same parts.

A represents the hopper for receiving the clay to be fed. Saving as it is modified by the improvement under consideration it is of the usual construction.

B represents the conveyer. It consists preferably of an endless belt, $b$, having flights, $b'$, or equivalent means for moving the clay, and sustained upon the sprocket wheels $b^2$, $b^3$, which in turn are suitably supported in bearings $b^4$, $b^5$, one, $b^4$, of which is adjustable, substantially as is indicated, to enable the belt to be properly tightened or slackened as may be desired. The parts thus far described are arranged in the usual manner to enable the clay to be suitably fed to a pulverizer, C, or other machine, or place. The ultimate support for the hopper is not shown. It can be of any suitable nature. The conveyer, as is seen, extends and works longitudinally through the hopper, one part, and usually the lower part, traveling along the bottom of the hopper, and the upper part of the belt along the upper part of the hopper, and the sprocket-wheels being arranged respectively beyond the ends of the hopper. The upper portion of the belt is guarded by means of a cover, D. The sides $a$, $a$, of the hopper are inclined toward each other as shown, and the bottom of the hopper is in the form of piping, E, through which any warming current, such as steam, hot air, or hot water, can circulate substantially as indicated by the arrows $e$. The piping, which is preferably in the form of a coil such as shown, substantially occupies the space between the hopper sides and thus not only forms a strong bottom for the hopper but also one which supplies heat to the clay, thereby sustaining the clay and preventing it from adhering to the hopper as it is being fed, and owing to the several turns in the coil it provides a large amount of heat surface. The clay by coming directly in contact with the pipes is readily and economically heated, and, to more effectively carry out this part of the improvement, the coil is inclosed, at its sides, between the timbers, F, F, and, underneath, by the board, G, by which means the heat of the coil is kept from wasting and is adapted to be thoroughly utilized in heating the clay. The flights, or whatever is attached to the conveyer-belt for moving the clay, can be made in any suitable manner to enable them to effectively transport the clay, and, if desired, they can, as shown in Fig. 4, be adapted at the edge, $b^6$, thereof to fit more or less around the various pipes in order thereby to more thoroughly scrape the dirt from off the pipes. Partly to enable the couplings, $e'$, to be applied to the pipes, $e^2$, and partly to provide increased heating-surface, the pipes are preferably spaced somewhat apart from each other as shown more distinctly in Fig. 4. The heat from the different pipes is thus advantageously given out, and the conveyer-flights, as seen, can work not only directly upon the top of the pipes but also well down between the several pipes. The board, G, underneath the pipes, serves, when the pipes are spaced well apart from each other, to keep the dirt from undesirably wasting through the hopper-bottom. Power is imparted to move the conveyer-belt, in the direction indicated by the arrows $x$, by any suitable means not shown. If desired a thin piece of sheet metal can be interposed between the piping and the conveyer-flights.

I claim—

1. A clay feeder having its hopper bottom formed by a coil of heating pipe inclosed at the sides by the timbers F, and underneath by the board G, whereby the heat is kept from wasting, and the escape of dirt through the bottom is prevented, said feeder being suitably provided with means for conveying the clay along the said bottom, substantially as described.

2. The combination, in a clay feeder, of the hopper having the bottom formed of a coil of pipe, with the conveyer-belt having the flights adapted at the edge to fit around the various pipes, substantially as described.

Witness my hand this 23d day of August, 1892.

MILTON F. WILLIAMS.

Witnesses:
C. D. MOODY,
A. BONVILLE.